June 14, 1949.  P. W. BADER ET AL  2,473,000
HANDLE AND SOCKET STRUCTURE
Filed May 29, 1947
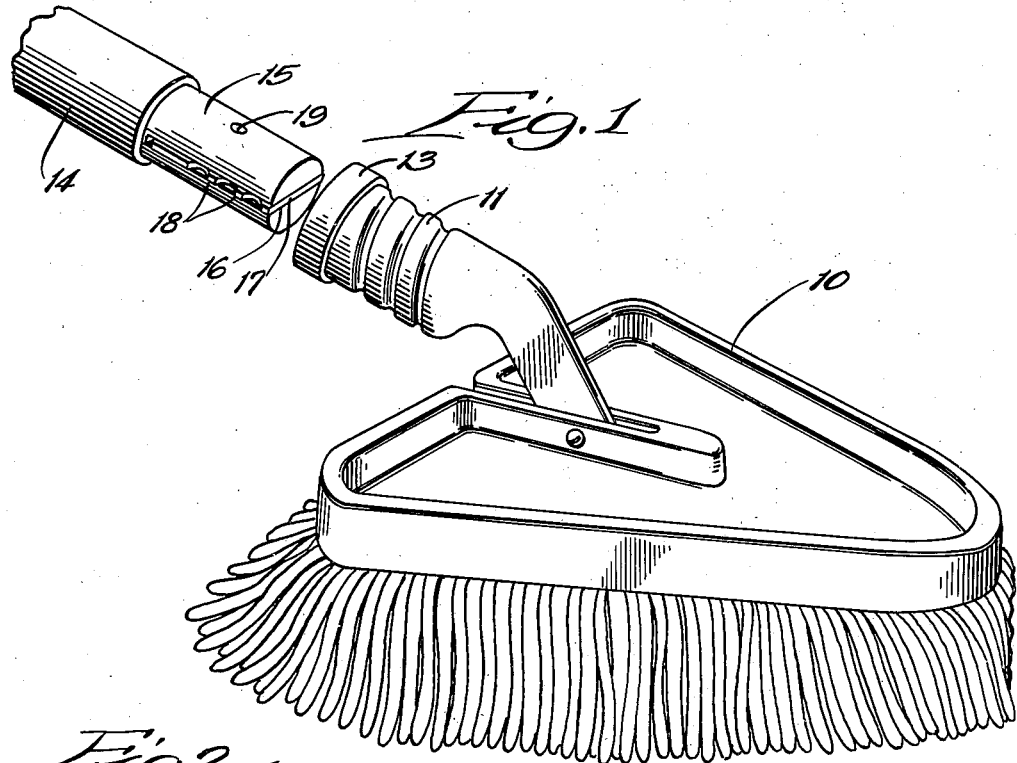
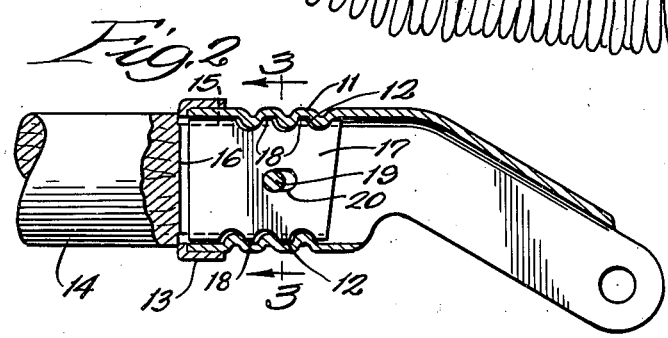
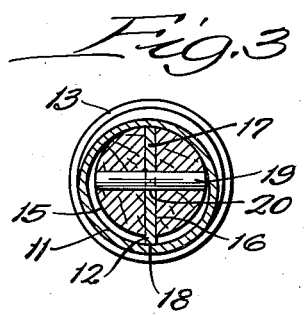
Inventors:
Paul W. Bader
and Frederic E. Oakhill,
By Dawson, Brothers & Faugarberg,
Attorneys.

Patented June 14, 1949

2,473,000

UNITED STATES PATENT OFFICE 2,473,000

HANDLE AND SOCKET STRUCTURE

Paul W. Bader, Chicago, and Frederic E. Oakhill, Wilmette, Ill., assignors to O-Cedar Corp'n, Chicago, Ill., a corporation of Illinois Application May 29, 1947, Serial No. 751,174

3 Claims. (Cl. 306—30)

This invention relates to a handle and socket structure and is particularly useful in providing a connection between a mop, and the like, and the handle therefor.

An object of the invention is to provide a new and unusually effective means for connecting a handle with a socket structure. A further object is to provide a readily installed means for connecting a handle to a grooved socket member. Yet, another object is to provide a slotted handle end with a tooth-equipped plate, which may be readily installed and which securely anchors a threaded socket upon the handle. Other specific objects and advantages will appear as the specification proceeds.

The invention is illustrated in a single embodiment by the accompanying drawing, in which—

Figure 1 is a perspective view of a mop socket and handle constructed in accordance with our invention; Fig. 2, a longitudinal section of the socket therein; and, Fig. 3, a transverse sectional view, the section being taken as indicated at line 3 of Fig. 2.

In the illustration given, 10 designates a mop head to which is pivotally secured a socket member 11. The socket 11 is provided with spiral grooves 12, and the open end of the socket is reinforced with a ferrule 13.

The handle 14 is provided with a reduced end portion 15, and the end portion 15 is provided with a longitudinal slot 16. Within the slot 16 extends a metal plate 17, provided with laterally extending teeth 18. A nail 19 extends through the reduced end 15 and through a slot 20 in the plate 17, as shown more clearly in Fig. 2.

It will be understood that the plate 17 may be secured within the end 15 of the handle in a variety of ways. For example, the slot 16 may be formed so as to terminate short of the outer end of the handle, and the plate 17 may be extended laterally into the slot. If desired, staples may be used with the structure shown in Fig. 1 so as to enter the end of the handle, and thus secure the plate 17 in place. We prefer, however, to secure the plate 17 in position by driving the nail or other securing member 19 transversely through the handle end 15 and through the slot 20. By this means, the plate is locked in a very simple manner against withdrawal.

The teeth 18 are so spaced as to engage the spiral grooves 12 of the socket 11. We prefer to have the teeth extend laterally from both sides of the plate, as shown more clearly in Fig. 2, but it will be understood that, if desired, the teeth may extend from one side only of the plate 17.

In the operation of the structure, the handle end 15 equipped with the plate 17, as shown in Fig. 1, is introduced into the socket 11 and screwed into the socket with the teeth 18 engaging the spiral grooves 12. In this operation, the teeth 18 because of their narrowness, tend to grip the grooves 12 when the handle is screwed tightly into final position and render disengagement difficult. Disengagement does not occur after long continued use, and it requires a positive turning of the handle 14 to bring about a separation of the parts. With the thread and groove connections heretofore used, there has been a tendency for the threads to work loose after a period of operation, and the user is obliged to turn the handle frequently in order to tighten the parts. In the new structure, the narrow and edged teeth 18, under the pressure produced by bringing the parts together, tend to form a tight locking engagement with the grooves of socket 11, and, thus, do not tend to work loose.

The structure is extremely simple, easy to install, and represents a substantial saving in materials. Soft wood, which could not retain a thread for effective engagement with the socket, may be employed successfully with plate 17. The metal required is small, a relatively thin plate 17 furnishing the teeth 18. For assembling, it is necessary only to form a slot in the handle end 15 and to drive the securing element 19 through the handle end, as shown in Fig. 2. The teeth 18 permit a ready joining of the handle end 15 to the socket 11, and when the joining is completed, the connection remains intact until a positive relative turning of the members 14 and 11 bring about a desired disengagement of these parts.

While we have set out one specific embodiment of the invention in substantial detail for the purpose of illustrating the invention, it will be understood that the details of such structure may be varied widely by those skilled in the art without departing from the spirit of our invention.

We claim:

1. In a handle and socket structure of the character set forth, a socket member provided with a spiral groove, a handle member provided with a slot extending inwardly from the end thereof and longitudinally of the handle end, a plate of a length substantially equal to the length of said slot and having a slot in the end portion thereof, said plate being received within said slot, and a transverse pin extending through said handle and through the slot in said plate, said plate having spiral teeth projecting slightly beyond the periphery of said handle and adapted to engage the spiral groove of said socket.

2. In a handle and socket structure of the character set forth, a socket member provided interiorly with a spiral groove, a handle having an end portion of substantially uniform diameter and provided with a longitudinally extending slot opening at the outer end of the handle, a plate having a length substantially equal to the length of said slot and having a central opening and laterally extending teeth, said teeth being spaced apart so as to engage the spiral groove of said socket, and a pin extending through said handle and through said central opening of said plate to lock said plate within said slot.

3. In a structure of the character set forth, a socket provided interiorly with a spiral groove, a handle having a reduced end portion of substantially uniform diameter, said handle end being provided with a longitudinally extending slot substantially equal in length to the reduced end portion of said handle, said slot opening at the outer end of said handle, a plate having a length substantially equal to that of said slot and adapted to be received therein with its outer end flush with the end of said handle, said plate having spaced teeth projecting beyond the periphery of said reduced handle portion but not beyond the periphery of the main handle portion, said plate being provided with a elongated slot in the central portion thereof, and a pin extending through said handle and through said slot in said plate to confine said plate therein, said teeth of said plate being adapted to engage the spiral groove of said socket.

PAUL W. BADER.
FREDERIC E. OAKHILL.

REFERENCES CITED

The following references are of record in the file of this patent:

UNITED STATES PATENTS

| Number | Name | Date |
|---|---|---|
| 437,062 | Tyler | Sept. 23, 1890 |
| 583,869 | Nass | June 1, 1897 |
| 1,191,810 | Miller | July 18, 1916 |
| 1,480,365 | Bennett | Jan. 8, 1924 |
| 2,117,373 | Sobotka | May 17, 1938 |
| 2,271,167 | Zachry | Jan. 27, 1942 |

FOREIGN PATENTS

| Number | Country | Date |
|---|---|---|
| 860 | Great Britain | 1913 |
| 265,039 | Germany | Oct. 3, 1913 |